Patented Dec. 23, 1952

2,623,052

UNITED STATES PATENT OFFICE 2,623,052

3-SUBSTITUTED-5-TERNORCHOLENYL FORMALDEHYDES

Frederick W. Heyl, Kalamazoo, Mich., and Albert P. Centolella, Elkhart, Ind., assignors to The Upjohn Company, Kalamazoo, Mich., a corporation of Michigan No Drawing. Application May 1, 1950,
Serial No. 159,376

8 Claims. (Cl. 260—397.4)

The present invention relates to cyclopentanopolyhydrophenanthrene aldehydes, which are prepared by oxidation of compounds of this series having a 22—23 double bond. The invention particularly relates to 3-substituted-5-ternorcholenyl formaldehydes having the following formula:

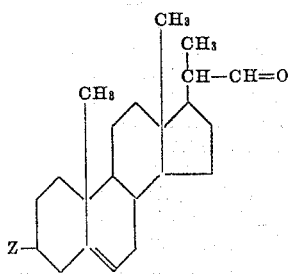

wherein Z is a hydroxyl, acyloxy, alkoxy or aralkoxy radical, derivatives of the said 3-substituted-5-ternorcholenyl formaldehydes, and to a method for the preparation of such compounds.

It is already known to oxidize a steroid sidechain double bond, and that such an oxidation with ozone as the active oxidizing agent will yield a cyclopentanopolyhydrophenanthrene acid. However, that such oxidation might be carried out on stigmasterol, and other similar compounds wherein the side-chain double bond is in the 22—23 position, to yield aldehydes containing the cyclopentanopolyhydrophenanthrene nucleus, has heretofore been unreported. All oxidations of such compounds, as previously conducted, have led only to the production of acids containing the polycyclic nucleus. Fernholz [Ann. 507, 132 (1933)] was the first to report oxidation of stigmasteryl acetate dibromide with ozone, but obtained only the 3-acetoxy-5-bisnorcholenic acid. Others, since Fernholz, have oxidized stigmasterol derivatives, but have not obtained any cholenyl aldehyde from the reaction products.

It is an object of the present invention to provide new compounds which are useful as intermediates in the synthesis of steroid derivatives, including certain hormones. A further object of the invention is the provision of 3-substituted-5-ternorcholenyl formaldehydes having the general formula given, and derivatives thereof. Other objects of the invention will become apparent hereinafter.

In direct contrast to the results of prior investigators, we have now determined that excellent yields of aldehydes containing the cyclopentanopolyhydrophenanthrene nucleus may be obtained by oxidizing a steroid compound containing a double bond in the 22—23 position. If it is desired that the final product have nuclear unsaturation, such as in the preparation of cholenic aldehydes, it is of course necessary that only oxidation-stable groups be present in the molecule during the oxidation process. Nuclear double bonds may thus be protected in a suitable manner, such as by addition thereto of halogen or hydrogen halide, which may later be removed to restore the desired unsaturation. Alternatively, i-ethers or i-esters may be prepared to allow protection of the double bond during oxidation, and may be treated subsequently to reintroduce the same. The i-ethers and i-esters appear to be somewhat more selective than halogen in protection of the double bond, and in some instances are found to give higher yields of the desired product. While some of the desired aldehyde product may be obtained whether or not double bonds of the polycyclic nucleus are protected, it is desirable for highest yields that the double bond be protected as previously indicated. If there are in the molecule other oxidation unstable groups, such as hydroxyl, these may be protected by conventional procedure, such as by etherification or esterification, before the oxidation is carried out, but such protection is not necessary for a hydroxyl group in the 3 position, as indicated by Example 6 herein.

The process of the invention may be more clearly understood from an inspection of the following illustrative formulae, wherein $R_2$ represents hydrogen or a part of the steroid side-chain further removed from the polycyclic nucleus than the double bond being oxidized, and wherein Z represents hydroxyl or a group convertible thereto with the aid of hydrolysis, such as ether groups of the formula —OR, wherein R is a hydrocarbon radical, especially hydrocarbon radicals containing up to and including eight carbon atoms, e. g., methyl, ethyl, propyl, isopropyl, butyl, octyl, cyclohexyl, benzyl, and the like, or ester groups of the formula —OCOR$_1$, wherein $R_1$ is a hydrocarbon radical, especially hydrocarbon radicals containing up to and including seven carbon atoms, such as methyl, ethyl, propyl, isopropyl, butyl, hexyl, heptyl, phenyl, cyclohexyl and the like.

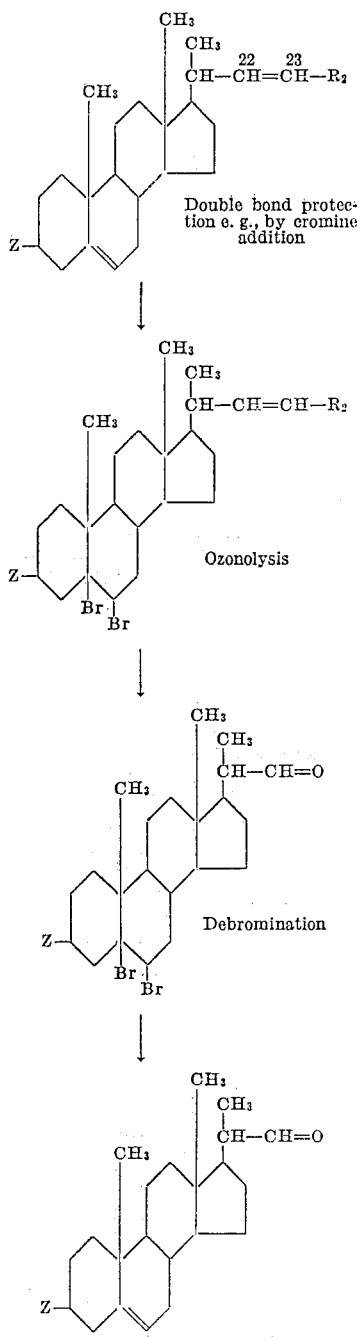

If, instead of employing halogen as illustrated in the above equations, the double bond is protected through the preparation of 6-i-ethers or 6-i-esters of the compound being oxidized, an alkoxy or acyloxy unsaturated aldehyde will be the final product. Upon dealkylation, this ether or ester readily converts to the desired 3-hydroxy aldehyde.

The process by which the compounds of the present invention are produced is influenced by several factors among which are the quantity of oxidizing agent employed and the presence or absence of an acid-binding agent. The effect of the quantity of oxidizing agent employed, i. e., ozone, and the presence of an acid-binding agent, is clearly shown in the following table, in which data are given for the oxidation of stigmasteryl compounds.

| Moles of Ozone per mole of steroid | Acid-binding Agent | Aldehyde, percent |
|---|---|---|
| 2.58 (1.68) | None | 13.5 |
| 2.06 (1.34) | do | 19.1 |
| 1.74 (1.13) | do | 20.7 |
| 1.06 (0.69) | do | 19.6 |
| 2.05 (1.35) | 2% (of solvent used) | 44.0 |
| 2.00 (1.31) | do | 41.0 |
| 2.00 (1.31) | do | 61.0 |

Blank determination showed that the chloroform used as solvent in the above experiment, i. e., three hundred milliliters, destroyed about 35 percent of the ozone employed, and the values in the parentheses are adjusted for this loss. It is not presently known, however, whether this loss to the chloroform solution would occur more readily than the oxidation of the double bond of the particular steroid being treated.

The value of an acid-binding agent is clearly indicated. When none is employed, the steroid solution in chloroform or other solvent gives a distinct acid reaction when applied to wet Congo red paper. However, when an acid-binding agent is used, the solution gives no acid reaction with moist Congo red paper. Any acid-binding agent which is not reactive toward ozone, which will not react with the products of reaction, and which will reduce the acidity of the solution below that detectable by Congo red paper, is suitable. Among such agents may be mentioned organic amines such as pyridine, piperidine, piperidine acetate, lutidines, quinoline, aniline, alkylanilines, alkylamines, dialkylamines, and trialkylamines; inorganic bases such as sodium carbonate and sodium bicarbonate, as well as other alkali-metal carbonates and bicarbonates.

In its broader sense, the process comprises the oxidation to an aldehyde of any steroid derivative having a double bond in the 22—23 position. Representative compounds besides stigmasterol which may be oxidized in this manner include ergosterol, spinasterol, neoergosterol, lumisterol, trihydroxybufosterocholenic acid, and derivatives of the foregoing. The reaction is usually conducted in a suitable inert solvent. After the oxidation has been completed, using no great excess of oxidizing agent, the solvent is removed, excess ozone destroyed, double bonds restored as by dehalogenation, and the desired aldehyde isolated through suitable derivatives. Standing of the reaction mixture for any lengthy period after the oxidation has been completed should be avoided, as further unknown reactions sometimes occur to render isolation of the aldehydic product extremely difficult, if not impossible.

Of critical importance in carrying out the ozonization is the amount of ozone employed. By the employment of from about 0.5 to about 2.0 moles of ozone per mole of steroid compound, not allowing for any loss to the solvent, the objects of the present invention are accomplished, and the desired aldehydes are obtained in high yields.

When the prescribed amount of ozone is employed in the process, optimum yields of aldehyde are obtained with a minimum amount of undesirable by-products and waste of the starting ozone. If a solvent is employed for the reaction, it may be necessary to run a blank determination. Many solvents are suitable as the reaction medium, and it is entirely satisfactory to use a chlorinated hydrocarbon, preferably chlorinated ethylenes or methanes. Whichever solvent is employed, a blank should be run on the amount of solvent used. For example, in a reaction using 300 milliliters of chloroform as a solvent, 35 percent of the applied ozone was destroyed. It is therefore advisable, if not necessary, to introduce ozone into the reaction in sufficient excess to compensate for this loss.

While the above-identified range for the quantity of oxidizing agent has been found optimum for the production of aldehydes containing the cyclopentanopolyhydrophenanthrene nucleus, the most satisfactory ozonizations have been carried out using approximately 1.3 to 1.5 equivalents of ozone (moles of ozone per mole of steroid). This amount of ozone does not allow for the loss due to destruction by the solvent, and, while from 0.5 to 2.0 equivalents are used without consideration of this factor, from 1 to 2.5 equivalents are usually introduced into the process to allow for loss to the solvent.

It has been stated previously that the presence of an acid-binding agent is of importance to the process, and representative acid-binding agents have already been given. Up to about five percent of acid-binding agent, calculated on a basis of the total solvent used, is usually most satisfactory. When operating in this manner, yields of desired aldehyde as high as 61 percent have been obtained. This is an exceptionally high yield for any oxidation reaction involving a steroid compound.

The following examples are given to illustrate the practice of our invention, but are in no way to be construed as limiting.

*Example 1.—3-acetoxy-5-ternorcholenyl formaldehyde (3-acetoxy-(delta-5)-bisnorcholenal-22) and its semicarbazone*

Six grams of stigmasteryl acetate dibromide (obtained from stigmaterol by acetylation and halogenation) was dissolved in 300 milliliters of chloroform and ozonized at zero degrees centigrade until 2.58 equivalents of ozone had been passed into the solution. Chloroform was removed from the ozonide in vacuo below thirty degrees centigrade, the ozonide then being decomposed with zinc in acetic acid. Ether was added and, after decantation from the zinc dust, the acetic acid was removed by washing with water. The 3-acetoxy-5-bisnorcholenic acid was removed as the insoluble sodium salt, as described by Fernholz. Other acidic substances were extracted with two-normal sodium hydroxide solution. The ether solution was dried, the ether removed, and the unreacted stigmasteryl acetate crystallized from a solution of the residue in a minimal amount of alcohol. The alcohol was removed from the supernatant liquid, and the residue refluxed with hexane. The hexane solution was filtered to remove the hexane-insoluble material and the filtrate evaporated to dryness in a nitrogen atmosphere under reduced pressure. The residual solid was dissolved in fifty milliliters of methanol and shaken with 100 milliliters of forty percent sodium bisulfite solution, a non-filterable gel-like suspension of the sodium bisulfite addition complex of 3-acetoxy-5-ternorcholenyl formaldehyde resulting. To the suspension was added 250 milliliters of ether, the mixture shaken, and ice-water then slowly added until two layers were formed, whereupon the bisulfite complex appeared at the interface. The solid bisulfite complex was collected, washed with ice-water, ether, and dried.

One gram of the dried bisulfite addition compound was added to sixty milliliters of a ten percent sodium carbonate solution and 150 milliliters of ether contained in a separatory funnel. Nitrogen was introduced into the bottom of the mixture until the disappearance of the bisulfite complex. The ether layer was separated, the water solution extracted with ether, and the ether extracts combined. The combined ether extracts were washed with water until neutral, dried, and the ether removed under nitrogen. There was thus obtained 0.79 gram of 3-acetoxy-5-ternorcholenyl formaldehyde melting at 116–117 degrees centigrade.

Analysis:
Calculated for $C_{24}H_{36}O_3$___C, 77.40; H, 9.74
Found _____ 76.85; 9.50

The semicarbazone of the above aldehyde, after crystallization from boiling chloroform and methanol, melted at 210 degrees centigrade, $$[\alpha]_{26}^D = -41.9$$

The 2,4-dinitrophenylhydrazone of the above aldehyde, after crystallization from boiling chloroform and methanol, melted at 247–248 degrees centigrade, $[\alpha]_{28}^D = -25.9$.

*Example 2.—3-benzoyloxy-5-ternorcholenyl formaldehyde*

In a manner substantially that of Example 1, stigmasteryl benzoate was ozonized to give 3-benzoyloxy-5-ternorcholenyl formaldehyde, which, after purification by means of the bisulfite procedure as given in Example 1, melted at 180 degrees centigrade.

Analysis:
Calculated for $C_{29}H_{38}O_3$ ____ C, 80.14; H, 8.81
Found _____ 80.30; 8.71

The semicarbazone of the above aldehyde, after crystallization from alcohol, melted with decomposition at 255 degrees centigrade.

*Example 3.—3-acetoxy-5-ternorcholenyl formaldehyde (from stigmasteryl acetate)*

Six grams of stigmasteryl acetate was dissolved in 300 milliliters of chloroform, five milliliters of pyridine (two percent based on the chloroform) was added, and the ozonization conducted at zero degrees centigrade using a total of about two equivalents of ozone. The chloroform solution was washed with water to remove the acid salt, and after drying of the chloroform, removed in vacuo below thirty degrees centigrade. The residue was treated with zinc dust in acetic acid, after which the isolation and purification was continued as in Example 1.

*Example 4.—6-methoxy-i-ternorcholenyl formaldehyde and its semicarbazone*

Three and two-tenths grams of i-stigmasteryl methyl ether [Fernholz and Ruigh, J. Am. Chem. Soc. 62, 3347 (1940)], in 150 milliliters of ethyl acetate, was ozonized at zero degrees centigrade with about two equivalents of ozone. The ozonide was decomposed with palladium on calcium carbonate hydrogen at atmospheric pressure [Fisher, Deal, and Ertel, Ber. 65, 1467 (1935)]. To the filtrate from the catalyst was added 1.5 grams each of semicarbazide hydrochloride and sodium acetate, and two milliliters of water. After refluxing for one hour, the mixture was concentrated to a small volume and the semicarbazone of 6-methoxy-i-ternorcholenyl formaldehyde extracted with ether. The ether solution was washed with alkali, water, and dried. After removal of the ether, the viscous residue was refluxed with two separate portions of hexane and the remaining colorless solid then crystallized from alcohol. The melting point of 6-methoxy-i-ternorcholenyl formaldehyde semicarbazone was 188-190 degrees centigrade.

Analysis:
Calculated for
$C_{24}H_{39}N_3O_2$ _____ N, 10.45
Found _____ 10.25
$[\alpha]_{26}^D = +213°$

*Example 5.—3-methoxy-5-ternorcholenyl formaldehyde and its semicarbazone*

6 - methoxy - i - ternorcholenyl formaldehyde semicarbazone (4.5 milligrams) from Example 4, was dissolved in 25 milliliters of warm methanol. Two drops of hydrochloric acid was added, and the solution refluxed for thirty minutes. After addition of two drops of water, the compound began to crystallize and, upon further cooling, separated and was filtered. The precipitate was washed with ether and small amounts of methanol, then crystallized from methanol to give 3-methoxy-5-ternorcholenyl formaldehyde semicarbazone. Yield 200 milligrams, melting point 204-206 degrees centigrade. This product corresponds to the same product produced by ozonization of stigmasteryl dibromide methyl ether according to the method of Example 1.

Analysis:
Calculated for
$C_{24}H_{39}N_3O_2$ _____ N, 10.45
Found _____ 10.17
$[\alpha]_{26}^D = -59.85$

*Example 6.—3-hydroxy-5-ternorcholenyl formaldehyde*

A solution of 1.6 grams of bromine dissolved in ten milliliters of chloroform was added over a period of about fifteen minutes with stirring to a solution of 4.13 grams of stigmasterol in 300 milliliters of chloroform maintained at a temperature of about zero degrees centigrade. Five milliliters of pyridine was added and ozone was passed into the solution, still maintained at about zero degrees centigrade, until about 140 percent of the ozone required to form a mono-ozonide had been added. The solvents were removed under reduced pressure, the residue dissolved in a mixture of fifty milliliters of glacial acetic acid and fifty milliliters of ether, eight grams of zinc dust added and the suspension stirred for about ten minutes. Four hundred milliliters of ether was added, the suspension filtered, the filtrate washed with respectively water, cold ten percent sodium hydroxide solution, water, and dried. The ether was removed from the dry solution until a volume of about ten milliliters was obtained, and the solution then cooled. A precipitate of 3-hydroxy-5-ternorcholenyl formaldehyde was obtained, which, after crystallization from methanol, weighed 1.75 grams and melted at 151-153 degrees centigrade.

Analysis:
Calculated for $C_{22}H_{34}O_2$ __ C, 79.94; H, 10.37
Found _____ 79.94; 10.28

The semicarbazone was prepared and, after crystallization from alcohol, melted at 202-203 degrees centigrade.

*Example 7.—Diethyl acetal of 3-hydroxy-5-ternorcholenyl formaldehyde*

An ethereal solution of 3-acetoxy-5-ternorcholenyl formaldehyde obtained from the methanol solution in Example 1 or 3, before preparation of the semicarbazone, was diluted with benzene and distilled to remove the last traces of moisture. Freshly distilled ethyl orthoformate and two drops of sulfuric acid were added, and the volume of the solution reduced during one hour by slow distillation. The solution was made alkaline, poured into water, and extracted with ether. The 3-hydroxy acetal was separated after saponification with one percent alcoholic potash, whereupon it was again precipitated with water and reextracted with ether. After removal of the ether, the diethyl acetal of 3-hydroxy-5-ternorcholenyl formaldehyde was recrystallized from hexane. The compound melted at about 175 degrees centigrade.

Analysis:
Calculated for $C_{26}H_{44}O_3$ __ C, 77.20; H, 10.96
Found _____ 77.36; 10.69

*Example 8.—Proof of structure*

An ethereal solution of 3-acetoxy-5-ternorcholenyl formaldehyde from Example 3, when treated with phenyl magnesium bromide, gave the phenyl-3-hydroxy-5-ternorcholenyl carbinol of Butenandt and Fleischer [Ber. 70, 96 (1937)], melting point 240 degrees centigrade. The carbinol formed a diacetate, melting point 216-217 degrees centigrade (Butenandt and Fleischer, ref. above), a dibenzoate, melting point 234-235 degrees centigrade [Cole and Julian, J. Am. Chem. Soc. 67, 1312 (1945)], and a dipalmitate, melting point 45-50 degrees centigrade.

In a manner analogous to that used for preparation of the phenyl carbinol, the α-naphthyl-3-hydroxy-5-ternorcholenyl carbinol was prepared, using α-naphthyl magnesium bromide. The product had a melting point (sublimation point) of 245 degrees centigrade.

Analysis:
Calculated for $C_{32}H_{42}O_2$ ___ C, 83.66; H, 9.22
Found _____ 83.84; 9.29

The diacetate melts at 198-200 degrees centigrade.

*Example 9.—3-ethoxy-5-ternorcholenyl formaldehyde*

When ozonized in a manner substantially similar to that of Example 1, 3-ethoxystigmasterol, melting at 98-100 degrees centigrade, $[\alpha]_{28}^D = -38.5$

[prepared by heating the 3-p-toluenesulfonyl ester of stigmasterol and ethyl alcohol according to the procedure of Stoll, Z. physiol. Chem. 207, 151 (1932); ibid., 246, 8 (1937)], gives 3-ethoxy-5-ternorcholenyl formaldehyde which can be purified by means of the bisulfide procedure as given in Example 1.

*Example 10.—3-butoxy-5-ternorcholenyl formaldehyde*

When ozonized in a manner substantially similar to that of Example 1, 3-n-butoxystigmasterol, melting at 109-110 degrees centigrade, $[\alpha]_{26.5}^D = -47.4$ gives 3-n-butoxy-5-ternorcholenyl formaldehyde which can be purified by means of the bisulfite procedure given in Example 1.

*Example 11. — 3 - benzyloxy - 5 - ternorcholenyl formaldehyde*

3-benzyloxystigmasterol (which melted to a clear melt at 99–100 degrees centigrade and which, on further slow heating, resolidified and again melted at 118–119 degrees centigrade, $[\alpha]_{26}^D = -39.5$) was ozonized in a manner substantially similar to that of Example 1 to produce 3-benzyloxy-5-ternorcholenyl formaldehyde which can be purified by means of the bisulfite procedure given in Example 1.

The new compounds of the present invention, 3-substituted-5-ternorcholenyl formaldehydes, have the following formula:

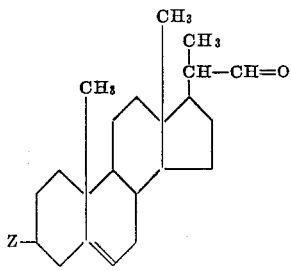

wherein Z is a hydroxyl, acyloxy, alkoxy or aralkoxy radical. The 5 double bond may be protected as a hydrohalide, dihalide or the 6-i-ether and 6-i-ester derivatives thereof.

Representative 3 position groups which are convertible to the hydroxyl group with the aid of hydrolysis include alkoxy groups such as the methoxy, ethoxy, propoxy, isopropoxy, butoxy, octoxy, cyclohexoxy, and benzyloxy radicals, as well as acyloxy groups such as acetoxy, propionoxy, butyroxy, octoyloxy, benzoyloxy, and so forth. The same or similar groups may be present in the six-position as a part of the i-ether or i-ester. The preferred embodiment of the invention, however, resides in the 3-substituted-5-ternorcholenyl formaldehydes. Representative aldehydic derivatives included within the scope of the invention are oximes, hydrazones, substituted hydrazones (e. g., phenylhydrazones and the 2,4-dinitrophenylhydrazones), semicarbazones, carbazones, and other similar derivatives. Representative members of this group of compounds have been prepared, identified, and found to be useful intermediates in the preparation of other steroid compounds, especially certain hormones.

This application is a continuation-in-part of our prior-filed application Serial 737,736, filed March 27, 1947, now abandoned.

Various modifications may be made without departing from the spirit or scope of the invention, and it is to be understood that we limit ourselves only as defined in the appended claims.

We claim:

1. A 3-substituted-5-ternorcholenyl formaldehyde having the formula:

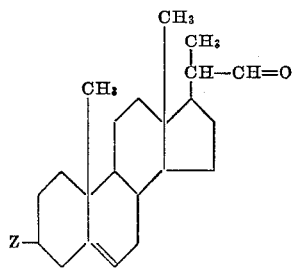

wherein Z is a radical of the group consisting of hydroxyl, alkoxy radicals having fewer than nine carbon atoms and acyloxy radicals of the formula AcO, wherein Ac is the radical of a hydrocarbon carboxylic organic acid containing up to and including eight carbon atoms.

2. 3-acetoxy-5-ternorcholenyl formaldehyde.

3. 3-methoxy-5-ternorcholenyl formaldehyde.

4. 3-hydroxy-5-ternorcholenyl formaldehyde.

5. A 3-lower-alkoxy-5-ternorcholenyl formaldehyde.

6. A 3-acyloxy-5-ternorcholenyl formaldehyde, the acyloxy group being of the formula AcO, wherein Ac is the radical of a lower aliphatic hydrocarbon monocarboxylic organic acid.

7. 3-benzoyloxy-5-ternorcholenyl formaldehyde.

8. 3-butoxy-5-ternorcholenyl formaldehyde.

FREDERICK W. HEYL.
ALBERT P. CENTOLELLA.

No references cited.